(12) United States Patent
Torgerson et al.

(10) Patent No.: US 6,601,441 B1
(45) Date of Patent: Aug. 5, 2003

(54) DEVICE AND METHOD FOR VERIFYING THE OPERATION OF A CHASSIS DYNAMOMETER

(76) Inventors: Garrett D. Torgerson, 5013 Dixon Line Way, Sacramento, CA (US) 95821; Michael J. St. Denis, 37 Saxony Ct., Roseville, CA (US) 95678

( * ) Notice: Subject to any disclaimer, the term of this patent is extended or adjusted under 35 U.S.C. 154(b) by 27 days.

(21) Appl. No.: 09/653,593

(22) Filed: Aug. 31, 2000

(51) Int. Cl.$^7$ .............................................. G01L 3/16
(52) U.S. Cl. ....................... 73/117; 73/123; 73/862.08
(58) Field of Search ........................ 73/670, 112, 116, 73/117, 121, 123, 124, 125, 126, 862, 862.08, 862.09

(56) References Cited

U.S. PATENT DOCUMENTS

| | | | |
|---|---|---|---|
| 4,466,294 A | 8/1984 | Bennington et al. | 73/862.13 |
| 4,753,110 A | 6/1988 | Burchett et al. | 73/146 |
| 5,101,660 A | 4/1992 | La Belle | 73/117 |
| 5,193,062 A | 3/1993 | Murase et al. | 364/426.04 |
| 5,375,460 A | 12/1994 | La Belle | 73/117 |
| 5,375,461 A | 12/1994 | Suzuki | 73/117 |
| 5,385,042 A | 1/1995 | La Belle | 73/117 |
| 5,450,748 A | 9/1995 | Evans et al. | 73/117 |
| 5,452,605 A * | 9/1995 | Wilson et al. | 73/117 |
| 5,465,612 A * | 11/1995 | La Belle | 73/117 |
| 5,521,482 A | 5/1996 | Lang et al. | 318/800 |
| 5,531,107 A * | 7/1996 | Ganzhorn, Jr. | 73/117 |
| 5,542,290 A * | 8/1996 | Suzuki | 73/117 |
| 5,657,227 A | 8/1997 | Freitag | 364/424.034 |
| 5,861,552 A | 1/1999 | Clayton, Jr. et al. | 73/117 |
| 6,044,696 A | 4/2000 | Spencer-Smith | 73/117 |

OTHER PUBLICATIONS

Automotive Handbook, Robert Bosch GmbH, 1986.

Dynamometer Tester Control System, Clayton Industries, Sep. 15, 1995.

Solicitation Package #95/96–001, Department of Consumer Affairs, Bureau of Automotive Repair, Sep. 15, 1995 (including "DynoCal" submitted by Real Time Instruments in response to Solicitation Package #95/96–001).

Page 54 of Real Time Instrument's "DynoCal" submitted by Real Time Instruments in response to Solicitation Package #95/96–001.

Acceleration Simulation Mode Test Procedures, Emission Standards, Quality Control Requirements, and Equipment Specifications Technical Guidance, U.S. Environmental Protection Agency, Jul. 1996.

DynoCal—A Chassis Dynamometer Calibrator, SAE 970268, Severino D'Angelo, Charles Brownell, and Curtis Brownell, Real Time Instruments; Garrett Torgerson, State of California Bureau of Automotive Repair; William G. Mears, Dynamotive Engineering, Feb. 24–27, 1997.

MASS99 Specifications, by Keating Technologies, Inc., Nov. 22, 1999.

IM240 & EVAP Technical Guidance, Transportation and Regional Programs Division Office of Transportation and Air Quality U.S. Environmental Protection Agency, Apr. 2000.

\* cited by examiner

*Primary Examiner*—Eric S. McCall
(74) *Attorney, Agent, or Firm*—Morgan & Finnegan, LLP (57) ABSTRACT

A test device and method for verifying the proper operation of a dynamometer is described. The inventive test device is portable and simple to operate, allowing dynamometer accuracy to be readily tested in the field.

16 Claims, 4 Drawing Sheets

Figure 1
(Prior Art BAR Test Device)

Figure 2
(Prior Art BAR TEST Device)

DEVICE AND METHOD FOR VERIFYING THE OPERATION OF A CHASSIS DYNAMOMETER

FIELD OF THE INVENTION

The present invention relates to a device and method for verifying the proper operation of dynamometers. The inventive device and method have particular application to the field of automobile and engine testing.

BACKGROUND OF THE INVENTION

Measurement of the exhaust emissions, fuel consumption, and performance of automobiles requires the accurate simulation of on-road operating conditions in a fixed location. Simulation of on-road operation is typically accomplished using a treadmill-like device called a chassis dynamometer.

A dynamometer, which applies a resistance (or "load") to the vehicle wheels as they turn one or more rollers, can be used to simulate a variety of driving conditions or testing scenarios including transient (i.e., "stop and go") drive cycles. Dynamometer devices are described in U.S. Pat. Nos. 5,861,552, 5,450,748, 5,101,660, 6,044,696, which are hereby incorporated by reference in their entirety.

In recent years, the use of chassis dynamometers has been required in state-mandated testing programs for the identification and repair of vehicles with excessive emissions. This requirement has stimulated a large increase in the number of dynamometers in use and a corresponding need to assure their proper operation.

In emissions testing, transient drive cycles are employed to simulate the conditions observed in normal driving and are characterized by variations in vehicle speed and dynamometer load as a function of time. However, if the load is applied improperly, the test yields inaccurate results that may lead to falsely passing a defective vehicle in an emission test or falsely failing a vehicle that should have passed the test. Consequently, proper operation of the dynamometer is necessary to assure accurate simulation of vehicle operation and accurate measurement of emissions.

The key to proper dynamometer operation is application of the appropriate load at the proper vehicle speed over a given driving cycle. A variety of methods exist to accurately load dynamometers. These methods are described in U.S. Pat. Nos. 5,375,460, 5,385,042, 5,531,107, 4,466,294, 5,542,290, 5,657,227, and 5,375,461 which are hereby incorporated by reference in their entirety.

A dynamometer may apply two types of load known as inertia load and road load to the vehicle under test. The inertia load simulates the power required to accelerate the vehicle. The road load simulates the power required to overcome frictional load on the vehicle. The dynamometer roller(s) supply some of the inertial load with the remainder of the load typically provided by flywheels driven by the dynamometer roller(s). A device commonly referred to as a power absorption unit (PAU) provides the road load. The PAU is typically an electric motor, eddy current brake or a water pump (usually called a water brake). With adequate control, the PAU can also be used to provide the inertia load, thereby eliminating the need for heavy flywheels to simulate the weight of the vehicle being tested.

A dynamometer controller controls the amount of load provided by the PAU. The controller adjusts the power absorbed by the PAU based on the specified vehicle characteristics (e.g., weight) and the vehicle speed and acceleration rate being simulated. The relationship between vehicle characteristics (such as weight, frontal area, and aerodynamic drag coefficient), the speed-time profile being simulated, and the target value of power absorbed by the dynamometer can be calculated from standard equations representing the dynamics of linear motion. (See e.g., *Automotive Handbook* by Robert Bosch GmbH, 1996, available at www.sae.org). The proportion of total dynamometer load provided by the PAU is dependent on whether or not flywheels are used to supply the inertia load.

Although the description of how a dynamometer is controlled may seem relatively simple, in fact, accurate control of a dynamometer is difficult. Dynamometer controllers must compensate for inter alia PAU response times and must respond very quickly to changes in vehicle speed when the PAU is used to supply inertia load. The dynamometer must also be "tuned" so that the PAU load properly accounts for dynamometer-specific factors which may change over time as the dynamometer components age and wear. Proper tuning requires an independent means of measuring dynamometer performance. However, an appropriate test device or method to carry out such testing has, until relatively recently, not been available.

In fact, little has been done to assure proper dynamometer performance during an actual test without using a dynamometer tester. In the past, manufacturers made and sold dynamometers without providing customers with the ability to independently verify whether the dynamometer was operating properly. If problems were suspected with a particular dynamometer system (e.g., an anomalous test result, such as abnormally high vehicle failure rates, was obtained), the commonly used means to crudely check performance was to employ a "cross-check" vehicle. In this test, a single cross-check vehicle was tested on several different systems to determine whether a statistically significant difference existed between emission levels produced with different dynamometers. However, this method is confounded by measurement errors in the vehicle exhaust sampling system and cannot identify the cause of the test discrepancy. Clearly, there is a need for a device and method to test the performance of dynamometers to verify their proper operation, and to assist in the diagnosis of problems if found.

One such test device was recently developed under contract to the California Bureau of Automotive Repair (BAR) (See e.g., BAR RFP Solicitation Package #95/96-001 "Solicitation Package For the Selection of a Contractor to Assist the State in the Design and Development of Device(s) or System for Performing Certification Testing of Dynamometers and Dynamometer Controls", Sep. 15, 1995, Department of Consumer Affairs, Bureau of Automotive Repair, 10240 Systems Parkway, Sacramento, Calif. 95827). The BAR test device quantifies dynamometer performance by measuring the accuracy with which a dynamometer performs transient loading simulation. The BAR test device operates by sitting on the dynamometer rollers like a car and controls both the speed and acceleration of the dynamometer while simultaneously measuring the dynamometer's load using the BAR test device's own load cell (which measures the torque from the dynamometer tester's electric motor). The BAR test device uses an external fifth wheel to quantify speed and determines dynamometer performance during transient simulation by integrating the speed and load signals and comparing them to the theoretical loading for the selected vehicle characteristics. This device is further described in Society of Automotive Engineers (SAE) paper 970268 ("DynoCal—A Chassis Dynamometer Calibrator", SAE International Congress and Exposition proceedings, Feb. 24–27, 1997, available at www.sae.org) which is hereby incorporated by reference.

The BAR test device identified a variety of problems with dynamometers that had never before been known or quantified. For example, the dynamometer control system, which was previously discussed, is often either under-damped or over-damped. Over-damped systems are slow to respond and reach the target load, whereas under-damped systems over-react to system inputs and behave erratically. In addition to dynamometer control problems, problems affecting vehicle loading accuracy were also readily apparent for the first time using the BAR test device. For example, during a typical vehicle test an independent computer instructs the dynamometer controller on which vehicle parameters to use. If this external computer selects the wrong parameters, the dynamometer will apply the wrong load even if the dynamometer is working correctly. This problem cannot be easily detected on transient tests without using a dynamometer tester such as the BAR test device.

In short, the development and use of the BAR test device made obvious the importance of dynamometer testing. To date, dynamometer testing using the BAR test device has focused on initial certification testing of dynamometers. However, in use testing is also important to ensure that equipment used in the field remains accurate. Such in-use quality assurance testing can only be done with a dynamometer tester. However, as set forth more fully below, the BAR test device is bulky and difficult to move. Thus, there is a need in the art for an improved and portable dynamometer test device and method of using same that can more accurately evaluate dynamometer performance in diverse locations.

SUMMARY OF THE INVENTION

The present invention is a test device and method for the evaluation of the performance of a dynamometer. The test device comprises a data acquisition system including a system to determine speed and to measure a signal from a load measuring device such as a load cell. Using custom software to automate data collection and calculation of the results (using the calculations described below) the system reads the load equivalent cell signal from either the dynamometer, the dynamometer's controller, or the dynamometer test system, and then collects speed data from the dynamometer or a separate speed measurement device during a test. A "load equivalent cell signal" is understood to mean a signal which may be a voltage, a digital signal or comparable output that provides the dynamometer test system feedback as to what the actual dynamometer load was, and is referred to herein below as a "load cell signal." The software enables the collected data to be analyzed to determine the accuracy with which the load is applied, as compared to what is theoretically required.

The test method comprises the steps of calibrating the inventive test device to accurately read the dynamometer's load measuring device or load cell signal, calibrating the speed measurement device, determining the parasitic drag in the dynamometer, and then performing a test on the dynamometer with a vehicle while collecting speed and load data. If the calibration settings are already known, or the parasitic loss characteristics of the dynamometer are already known, then these portions of the method can be omitted and the information can be entered directly into the inventive device software. When the test on the vehicle is complete, a spreadsheet with the calculations described below is used to automate calculation of the actual load applied and the theoretical load that should have been applied. This load can then be compared to the theoretical load that should have been applied to the vehicle to determine the difference (if any) between the measured load and the theoretical load. The magnitude of the differential enables an operator to easily determine if the dynamometer is operating properly.

Figure 1:
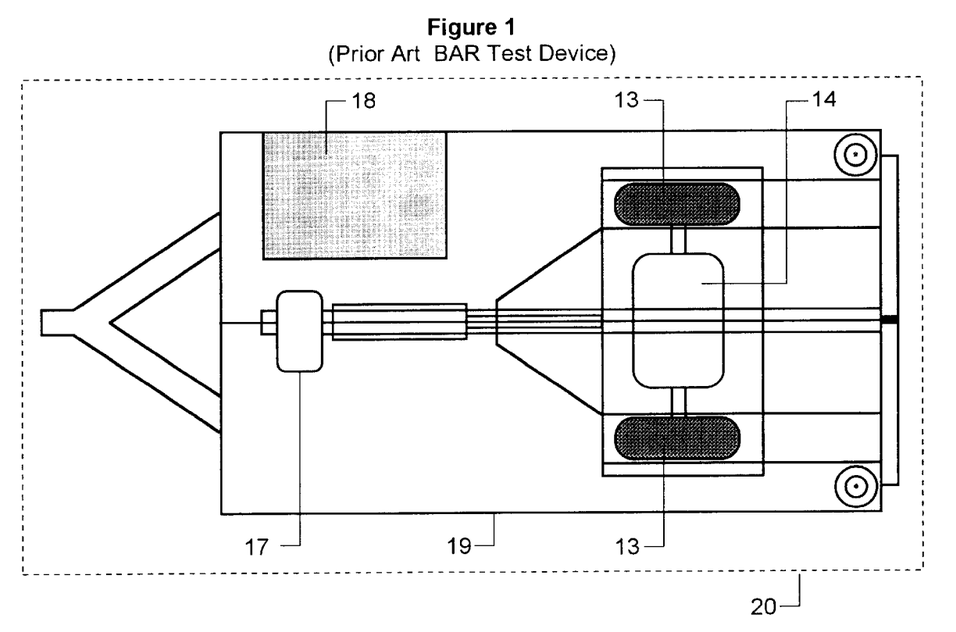
FIG. 1 is a top view schematic illustration of the prior art BAR test device and the trailer used for moving the device.
Figure 2:
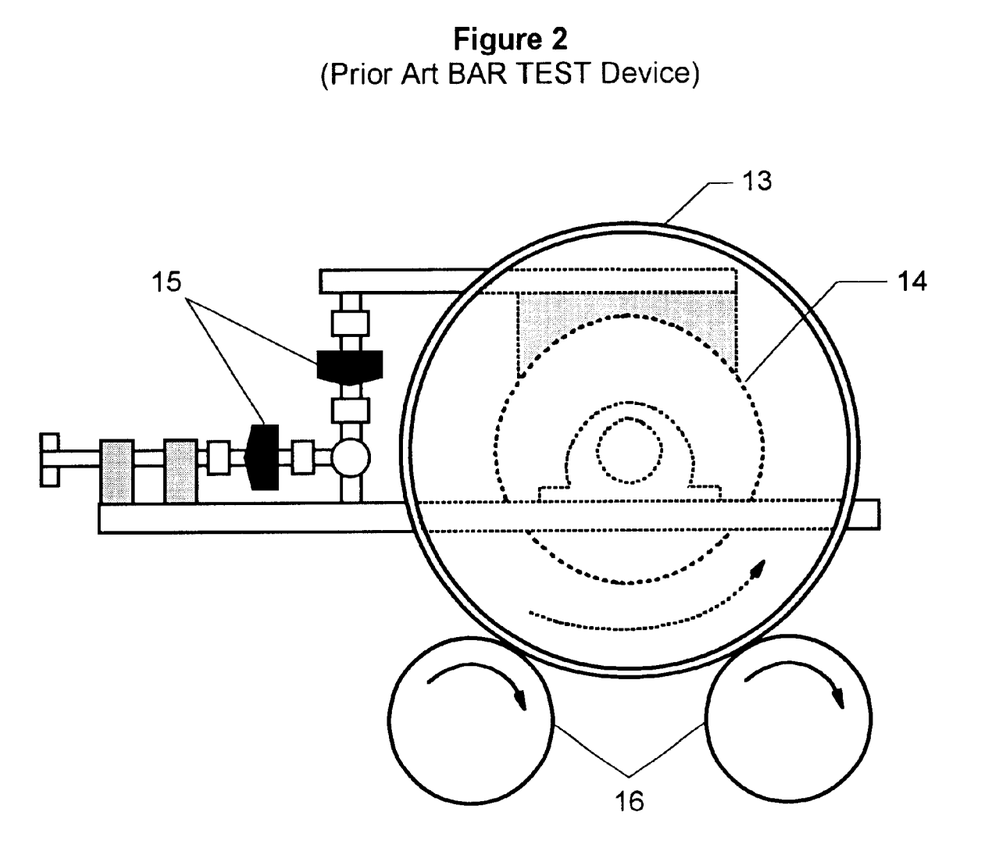
FIG. 2 is a side view schematic illustration of a portion of the prior art BAR test device seated on dynamometer rollers.

The inventive test device is an improvement over the BAR test device 20 (FIG. 1) in the simplicity of its use, convenience, versatility, and cost. First, the BAR test device is large and cumbersome, and weighs nearly 2000 lbs. It must be moved around in a specially built trailer 19 containing the control system 18, motor 14, and wheels 13, and must be unloaded with a winch 17 which is both time consuming and dangerous. Secondly, the BAR test device is complex and must be operated by a highly trained and experienced person in addition to at least one, if not two, assistants. In the hands of less skilled operators, the BAR test device can easily create misleading and inaccurate results. Furthermore, the operation of the BAR test device can itself introduce uncertainty into the test measurement. When positioned on a dynamometer, the BAR test device measures force applied at the surface of roller 16, through its tires 13, which sit on the dynamometer rollers 16 (FIG. 2). Consequently, slippage ("tire losses") can occur between the BAR tester's tires 13 and the dynamometer rollers 16 that must be accounted for. Compensating for tire losses is especially complicated because these losses change with tire temperature, which varies depending on the test cycle. Thirdly, the BAR test device lacks versatility in that it has only one axle and therefore cannot test four wheel drive dynamometers that electronically couple the front and rear axles on the dynamometer. Without mechanical coupling, it is impossible to accurately characterize dynamometer loading with certainty by only measuring the load on one of the axles of a multi-axle dynamometer. In fact, in these cases, dynamometer manufacturers must include load measuring devices or load cells at each axle to properly control load. In addition, since the BAR test device measures load while riding on chassis dynamometer rollers, it cannot be used to evaluate engine dynamometers where there are no rollers. Finally, the BAR test device is prohibitively expensive. The cost of the BAR test device can easily exceed $500,000. Operational costs are also high due to the need for highly skilled operators.

In contrast, the inventive test device fits easily into a 4"×12"×14" carrying case, and can be operated by a single person with minimal training. Since the inventive test device determines load directly from the dynamometer's own load measuring device or load cell instead of at the surface of the dynamometer rollers as in the BAR test device (as described above), the inventive test device is not affected by tire losses, thereby eliminating a major source of error. The inventive test device can also be used to test chassis dynamometers where sets of rollers are not physically coupled together as in electronically coupled four-wheel-drive dynamometers and split roller dynamometers that are not mechanically coupled side-to-side and which both utilize multiple power absorbers and load measuring devices or load cells. Furthermore, the inventive test device can be used to test engine dynamometers where there are no rollers and the engine is connected directly to the dynamometer. Lastly, the inventive test device can also be set up quickly and easily, with a cost less than one-tenth that of the BAR test device.

The inventive test device differs from the BAR test device in several ways. First of all, the BAR test device shown in FIGS. 1 and 2 uses an electric motor 14 to drive the dynamometer whereas the inventive test device uses any available automobile to drive the dynamometer. The electric motor 14 in the BAR test device accounts for the majority of its weight and inconvenience. The second difference between the BAR test device and the inventive test device, is that the BAR test device uses load measuring devices (such as load cells) 15 contained within it to read load generated by the electric motor 14 that is transmitted through tires 13 to the rollers 16, whereas the inventive test device uses the dynamometer's own load measuring device (such as a load cell; 5 in FIG. 3) to measure load. Thus, the BAR test device measures total dynamometer load, whereas the inventive test device measures only load at the dynamometer load measuring device or load cell (which usually excludes dynamometer parasitic losses). The inventive test device is able to operate in this way because parasitic losses are primarily speed and temperature dependent and can be accurately characterized by other means (i.e., dynamometer coast-down tests that measure dynamometer speed decay when unloaded at a higher speed). As a consequence of using the dynamometers own load cell to measure load, the inventive test device can also test dynamometers using multiple load measuring devices or load cells and multiple power absorbers, as is the case with non-physically coupled dynamometers. One such device is described in U.S. Pat. No. 5,101,660 which is hereby incorporated by reference in its entirety.

The following is a typical equation used to characterize dynamometer parasitic losses across a speed range after they are calculated at several speeds from data obtained by performing unloaded coastdowns (See e.g. EPA-AA-RSPD-IM-96-2, "Acceleration Simulation Mode Test Procedures, Emissions Standards, Quality Control Requirements, and Equipment Specifications", Section 85.4(b)(2), July 1996, and EPA420-R-00-007, "IM240 & Evap Technical Guidance", April 2000, Section 85.2226(a)(4), both available at www.epa.gov/oms/im.htm, which are hereby incorporated by reference):

$$\text{Parasitic Losses} = (A \times v^2) + (B \times v) + C$$

Where:

A, B, C are regression coefficients v=dynamometer speed

Equations for determining parasitic losses such as the above equation are familiar to people experienced in dynamometry.

Once the dynamometer parasitic losses are characterized, the target dynamometer load as a function of speed and time can be calculated according to the following equation derived from the EPA IM240 technical guidance (See e.g., EPA420-R-00-007, "IM240 & Evap Technical Guidance", Section 85.2226(a)(2), April 2000).

PAU LOAD (measured)=INERTIA LOAD (function of acceleration)+ROAD LOAD (function of speed)−BASE INERTIA LOAD (function of acceleration)−DYNAMOMETER PARASITICS (function of speed)−TIRE ROLLER FRICTIONAL LOAD (function of speed)

Where:

PAU LOAD=Load applied by the Power Absorption Unit, required to accurately simulate the vehicle characteristics.

INERTIA LOAD=Load required to accelerate the vehicle's mass at the applicable acceleration rate. This factor is derived from the simple physics of F=ma where f=force, m=vehicle mass and a=acceleration at the given time.

ROAD LOAD=Load required to offset the frictional forces encountered by the vehicle at the applicable speed. Road load is typically defined using a polynomial equation detailed in the EPA IM240 specification (See e.g., EPA420-R-00-007, "IM240 & Evap Technical Guidance", Appendix H, April 2000).

BASE INERTIA LOAD=Load required to accelerate the dynamometer's rotating mass at the applicable acceleration rate.

DYNAMOMETER PARASITICS=Load required to offset the dynamometer's friction at the applicable speed. See the aforementioned equation detailing parasitic losses.

TIRE ROLLER FRICTIONAL LOAD=Load required to offset the frictional forces at the tire/roller interface at the applicable speed. Tire losses are typically quantified according to the "generic tire/roll loss" (GTRL) equations in the EPA IM240 specification (See e.g., EPA420-R-00-007, "IM240 & Evap Technical Guidance", Appendix I, April 2000).

As with the parasitic loss determination equations, the equation for dynamometer loading and the variables included within are familiar to people experienced in dynamometry.

Since each of these factors, aside from PAU load, is a function of speed or acceleration and can be quantified independently, speed and acceleration are the only pieces of information necessary to predict PAU loading during a transient simulation. Speed is preferably recorded once per second (other intervals may also be chosen), while the load may be recorded as the median of multiple readings preferably over one second (other intervals may again be selected). Speed is recorded independently of the dynamometer control system with an optical tachometer, fifth wheel or similar speed measurement device.

Once the speed and load measurements have been recorded by the inventive test device, the theoretical load versus the actual load can be compared to determine the dynamometer accuracy using a variety of different analytical methods. One possible method examines overall error. The overall error method compares the sum of the second-by-second applied load to the sum of the second-by-second calculated load at the end of the test. Another possible analytical method reviews instantaneous error during a test. Instantaneous error is calculated by comparing the measured load to the actual load at each second of the test. A variation of the instantaneous method involves taking short-duration moving averages (e.g., 5 seconds) and comparing those averages throughout the test. Criteria defining the range of acceptable performance will vary depending on the vehicle test program requirements. For example, the Massachusetts Department of Environmental Protection has an instantaneous horsepower simulation percent error limit of 5%, with readings averaged over a 5 second interval ("MASS99 Specifications, Version 1.3R1", Section 2.5.4.b.2, Aug. 21, 2000, Massachusetts Department of Environmental Protection, One Winter Street, Boston, Mass., 02108). Other comparable analytical criteria may also be employed and are within the skill of people experienced in dynamometry.

DESCRIPTION OF THE PREFERRED EMBODIMENT

Figure 3:
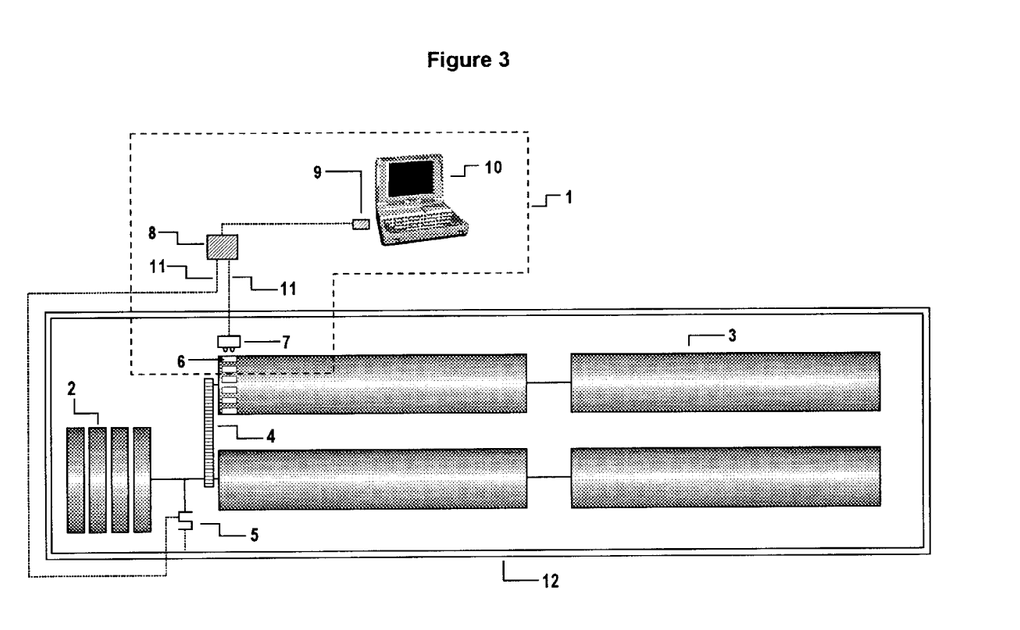
FIG. 3 is a schematic illustration of the inventive test device.

The inventive device (the dynamometer test device 1) is used to measure and record speed and load from a dynamometer 12 while it is in operation to determine the performance of the dynamometer (FIG. 3). The dynamometer 12 is comprised of a power absorption unit 2, rollers 3 (some dynamometers may have as few as one roller), a belt between the rollers 4 and a load measuring device (such as a load cell) 5. On some dynamometers, the belt is replaced by a direct drive or gear drive. The power absorption unit 2 absorbs energy from, and in some cases applies energy to, a vehicle through the rollers 3 during a test and the load measuring device 5 measures the force applied by the power absorption unit 2. The dynamometer roller belt 4 connects the rollers 3 to each other and in some cases to the power absorption unit 2.

The inventive device 1 comprises a device to measure the speed of the dynamometer rollers 3, a data acquisition system 8 (e.g., a National Instruments CB50LP terminal board), a data acquisition device 9 (e.g., a National Instruments DAQCard 1200 PCMCIA card), and a computer 10 (for example a Toshiba 2590CDT laptop personal computer) which are used to measure and record the roller speed and the force measured by the load measuring device 5. In one embodiment of the invention shown in FIG. 3, the device to measure the speed of the rollers comprises a reflective tape 6 applied to one of the rollers 3 and a photo tachometer 7 (e.g., an Extech Model 461900 phototach). Other devices to measure roller speed may also be used such as a fifth wheel, a magnetic pulse counter, an encoder and the like.

As shown in FIG. 3, the roller speed is measured by applying the reflective tape 6 to the roller 3 which when rotated generates pulses of light that are sent and received by the photo tachometer 7 and the frequency of the light pulses is proportional to the rotational speed of the roller 3. The data acquisition system 8, data acquisition device 9, and computer 10 are configured to measure the frequency of the pulsations from the reflective tape 6 passing underneath the photo tachometer 7 (which is proportional to the roller speed) and collectively to determine the dynamometer roller speed. The data acquisition device 9 may be a PCMCIA card (e.g., a National Instruments DAQcard 700 or 1200), a plug in board or any electronic device that is capable of converting the speed and load signals into digital signals that can be processed by the data acquisition software. The data acquisition system 8 also reads signals from the load measuring device 5 which is passed through the data acquisition device 9 to the computer 10. The computer 10 is equipped with data acquisition software (for example National Instruments LabView Version 5.1) that allows the signals from the data acquisition device 9 to be processed and the processed signals used in calculations to determine the accuracy of the dynamometer simulation.

The interconnection of the components is shown in FIG. 3. The inventive test device 1 is used by placing a piece of reflective tape 6 on one of the dynamometer rollers 3 which is connected to the power absorption unit 2 and, connecting signal sampling lines 11 from the data acquisition system 8 to the dynamometer load measuring device 5 and photo tachometer 7. The next step is recording the dynamometer physical parameters (such as the roller diameter, etc. described below), and calibrating the signal from the load measuring device 5. If the dynamometer rollers 3 are not coupled together, the reflective tape 6 and photo tachometer 7 are placed on the roller that is directly coupled to the PAU 2. The data acquisition system 8 is connected to the computer 10 via the data acquisition device 9.

The following dynamometer data is needed to perform the calculations: roller diameter, base inertia, number of teeth on any gears between the power absorption unit 2 and the rollers 3, characteristics of the vehicle simulated during the test and the relationship between load applied by the dynamometer and voltage read by the load cell. Typically, the dynamometer load applied vs. load cell voltage read relationship is determined using dynamometer manufacturer prescribed methods for calibrating the dynamometer. In most cases, the manufacturer prescribed method consists of a dead weight calibration (See e.g., EPA420-R-00-007, "IM240 & Evap Technical Guidance", Section 85.2226(a)(6), April 2000), but other methods may also be used and are known to those of skill in this art, including inertial calibration methods wherein the load cell is calibrated while measuring the time necessary for a dynamometer to accelerate or decelerate the dynamometer's base inertia though a given speed window while applying a constant command voltage to the dynamometer power absorption unit. In most cases, special equipment, such as a dead weight calibration kit, is required to perform a dead weight calibration on a dynamometer. This kit, which is typically provided by dynamometer manufacturers, consists of calibrated weights and a torque arm, usually an arbor, used to apply the weights to the dynamometer load cell. Knowing the value of the weights as well as the torque arm length, roller diameter, and dynamometer gear reduction, the ratio of the voltage read by the load cell to the torque produced by the calibration weight setup can be calculated. Since load cell voltages are typically linear relative to the force applied, dynamometer load can be predicted throughout the usable range of torques by knowing the load cell voltage with no weights applied.

The following is an example of a dynamometer load cell calibration which was used during a dynamometer test. The calibration arm is mounted to the PAU (as per the manufacturers directions) and the load cell voltages at the zero (with no weights on the calibration arm) and with the calibration weights on the dynamometer were recorded to calculate the relationship between load cell voltage and force at the roller surface.

Zero offset voltage=−0.01 VDC

Weight=110.0 lbs

Gearing=48/34

Arm=10.685 inches $$\text{Force}=110.0 \text{ lbs} \times (48/34) \times 10.685 \text{ in}/12 \text{ in/foot}=138.3 \text{ foot-lbs}$$

This equals a force applied tangentially to the roller surface of:

$$(12 \text{ inches/foot}/4.2865 \text{ inches}) \times 138.3 \text{ foot-lbs}=387.1 \text{ lbs}$$

With this weight on the calibration arm:

the load cell voltage=4.17 volts

The force at the roller surface and the load cell voltage are then used to compute the resulting force per volt:

$$387.1 \text{ lbs}/(4.17 \text{ volts}-0.01 \text{ volt})=93.1 \text{ lbs/volt}$$

This relationship is then used during the test along with the speed to calculate the power being applied by the PAU. For example, if at 15 mph the load cell reads 3.00 volts, the power applied equals:

$$3.00 \text{ volts} \times 93.1 \text{ lbs/volt} \times 15 \text{ mph}/375 \text{ mph-lbs/hp}=11.1 \text{ hp}$$

Once the speed and load measurement systems are in place and calibrated as detailed above, the parasitic losses of the dynamometer must be determined. While different dynamometer manufacturers may utilize different methods to characterize parasitic losses, typical characterization methods are detailed in the U.S. Environmental Protection Agency's emissions test equipment specifications (See e.g. EPA-AA-RSPD-IM-96-2, "Acceleration Simulation Mode Test Procedures, Emissions Standards, Quality Control Requirements, and Equipment Specifications", Section 85.4(b)(2), July 1996, and EPA420-R-00-007, "IM240 & Evap Technical Guidance", Section 85.2226(a)(4)). These equations compare the time it takes for an unloaded dynamometer to coast down through a speed window to determine the parasitic losses at the speed at the center of the window. By using multiple windows, multiple speed vs. parasitic loss points can be determined from which an equation characterizing parasitic losses can be regressed by using readily available software packages including Microsoft Excel. The results from this equation are then compared to the parasitic loss values stored in the dynamometer's control software. If the results are not relatively close (within about 5% is reasonable, however other limits may be used), then the source of the discrepancy is determined before proceeding since this will affect the accuracy of the dynamometer. If the results are relatively close (about 5% and below although other limits may also be chosen), the dynamometer-determined parasitic losses for the dynamometer tester calculations are used.

Next, the dynamometer to be tested is set up to run a normal test and to collect data when known vehicle characteristics data are entered. This vehicle information is usually derived from EPA new vehicle certification data and includes both vehicle weight and drag information. The vehicle is then placed on the dynamometer to drive the trace wherein the trace is understood to be a representation of a driving cycle relating vehicle speed and time. The data collection software, which records time, speed, and load, is started and the vehicle is operated on the dynamometer over any driving trace. During the driving, the speed and load signals are measured and can either be processed concurrently with the test or stored for post-processing at another time. While the following calculations represent one second of data processing in order to illustrate the calculation, other time intervals may also be selected.

Given:
Vehicle weight (m)=3000 lbs (93.24 slugs)
Dynamometer base inertia (BE)=2000 lbs (62.16 slugs)
Vehicle road load @ 20 mph (RL)=3.00 hp
Vehicle speed @ second T (v2)=21 mph=30.8 ft/sec
Vehicle speed @ second T−1 (v1)=20 mph=29.3 ft/sec
Dynamometer parasitic losses @ 20.0 mph (pl)=1.00 hp
Tire roller frictional load @ 20.0 mph (GTRL)=2.00 hp
Measured dynamometer load (Lm)=50.0 lbs (converted from rotational to translational)

Calculate:
Acceleration (a) at time T:

$$a=v2-v1$$
$$a=21.0-20.0=1.00 \text{ mph/sec}$$
$$a=1.467 \text{ ft/sec}^2$$

Vehicle inertia load (Iv) at time T:

$$Iv=m \times a$$
$$Iv=93.24 \times 1.467=136.8 \text{ lbs}$$

Iv converted to hp:

$$Pv=v2 \times Iv/550$$
$$Pv=30.8 \times 136.8/550=7.66 \text{ hp}$$

Base Inertia Load at time T:

$$Ibe=m \times a$$
$$Ibe=62.16 \times 1.467=91.17 \text{ lbs}$$

Ibe converted to hp $$Pb=v2 \times Ibe/550$$
$$Pb=30.8 \times 91.17/550=5.11 \text{ hp}$$

Using these values and substituting them into the PAU load equation, the following predicted power at the PAU is obtained:

Calculated PAU power (Ppau)

$$Ppau=7.66+3.00-5.11-1.00-2.00=2.55 \text{ hp}$$

From the measured PAU load and speed, the achieved PAU power is determined:

$$Pach=Lm \times v2/550$$
$$Pach=50.0 \times 30.8/550=2.80 \text{ hp}$$

The instantaneous error is determined by taking the difference between the actual and the measured power and dividing by the total load theoretically applied by the dynamometer.

$$Error=(Pach-Ppau)/(Pv+RL)$$
$$Error=(2.80-2.55)/(3.00+7.66)=0.024$$
$$Error=2.4\%$$

Figure 4:
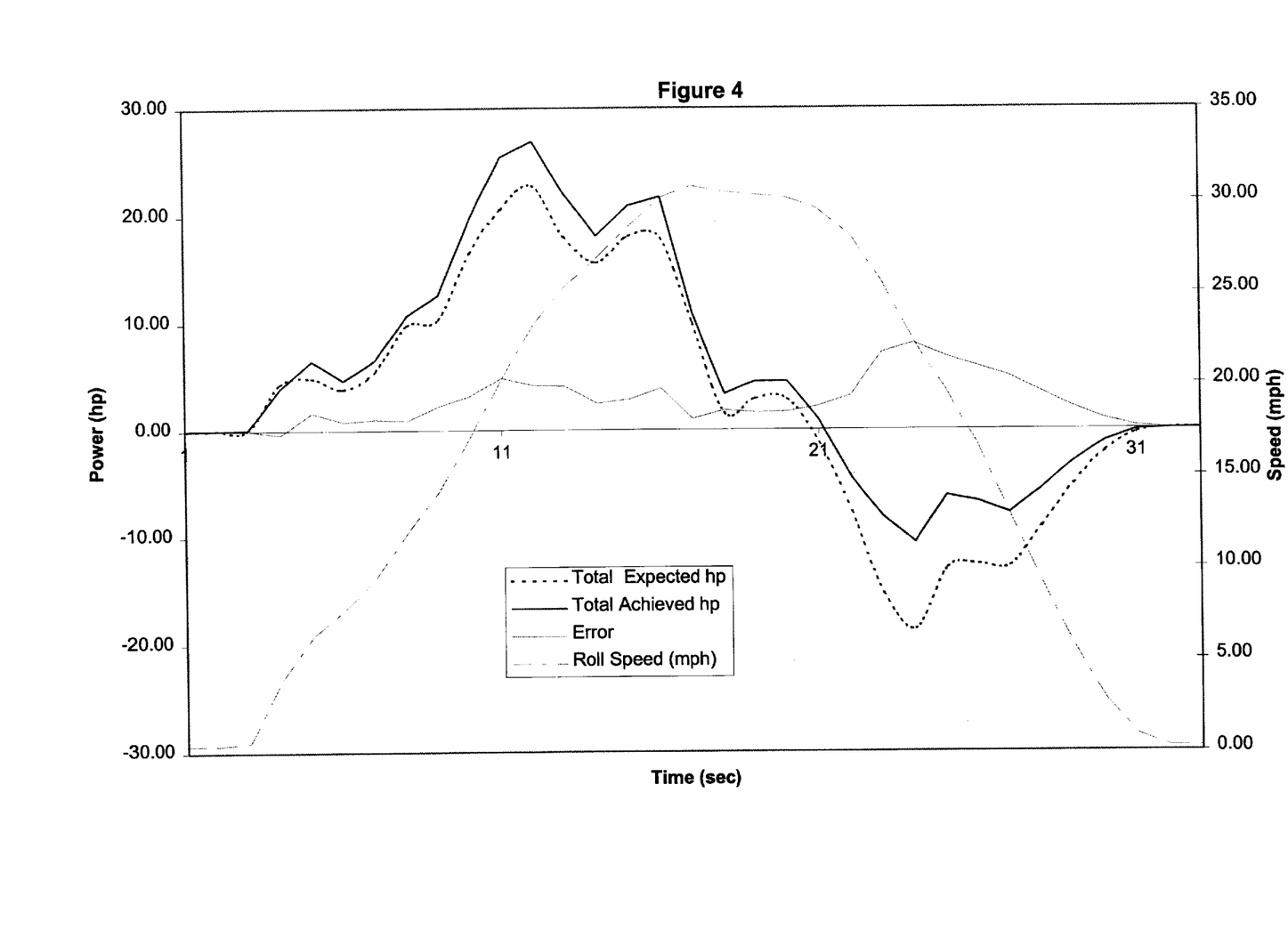
FIG. 4 illustrates data collected from the inventive test device showing theoretical and measured power, speed and error.

Sample second-by-second results of a dynamometer test are shown in FIG. 4. In this case, the dynamometer-achieved power (thick solid line) was above the expected power (thick dashed line) throughout the test. The thin dashed line labeled "Roller Speed" shows the drive trace driven during the test. The last thin solid line labeled "Error" shows the magnitude of the error throughout the test. FIG. 4 illustrates that the dynamometer was overloading the vehicle throughout most of the test. In an actual vehicle test, the measured vehicle emissions would probably have exceeded the emissions produced when the vehicle was operating correctly.

While the invention has been described in conjunction with preferred embodiments thereof, various modifications and substitutions can be made thereto without departing from the spirit and scope of the present invention.

We claim:

1. A method for testing the performance of a dynamometer and a control system thereof during a transient vehicle test or an engine test comprising the steps of:
   (a) attaching a data collection system, which is external to and independent of the dynamometer and the control system thereof and which comprises a device to measure a roller speed of the dynamometer, a device to measure a dynamometer load equivalent signal originated by a dynamometer's load measuring device, and a device capable of recording a rotational speed and load equivalent signal,
   (b) performing a dynamometer test, and
   (c) calculating a resulting theoretical and applied loading using speed and load equivalent signals to determine an error in an applied loading produced by the dynamometer and the control system thereof.

2. A method for testing the performance of a dynamometer and the control system thereof as set forth in claim 1 wherein the device to measure the roller speed of the dynamometer comprises a photo tachometer and reflective tape.

3. A method for testing the performance of a dynamometer and the control system thereof as set forth in claim 1 wherein the device to measure the roller speed of the dynamometer comprises a fifth wheel.

4. A method for testing the performance of a dynamometer and the control system thereof as set forth in claim 1 wherein the device to measure the roller speed of the dynamometer comprises a magnetic pulse counter.

5. A method for testing the performance of a dynamometer and the control system thereof as set forth in claim 1 wherein the roller speed is obtained from the dynamometer or a dynamometer's control system.

6. A method for testing the performance of a dynamometer and the control system thereof as set forth in claims 1, 2, 3, 4 or 5 wherein a load measuring device independent of the dynamometer's existing load measuring device is used in place of the original load measuring device to originate the load signal.

7. A method for testing the performance of a dynamometer and the control system thereof as set forth in claim 1 wherein multiple load measuring devices and roller speed measuring devices are used on the dynamometer.

8. A method for testing the performance of a dynamometer and the control system thereof as set forth in claim 1 wherein the dynamometer is connected to an engine or engine and transmission, rather than a whole vehicle.

9. A method for testing the performance of a dynamometer and a control system thereof during a transient vehicle test or an engine test comprising the steps of:

(a) attaching a data collection system, which is external to and independent of the dynamometer and the control system thereof and which comprises a device to measure a roller speed of the dynamometer, a device to measure a dynamometer load equivalent signal originated by a dynamometer's load measuring device, and a device capable of recording a rotational speed and load equivalent signal, (b) performing a dynamometer test, and (c) calculating a resulting theoretical and applied loading using speed and load equivalent signals to determine an error in an applied loading and wherein the dynamometer and the control system thereof is capable of testing vehicles of two or more axles.

10. A method for testing the performance of a dynamometer and the control system thereof as set forth in claim 9 wherein the device to measure the roller speed of the dynamometer comprises a photo tachometer and reflective tape.

11. A method for testing the performance of a dynamometer and the control system thereof as set forth in claim 9 wherein the device to measure the roller speed of the dynamometer comprises a fifth wheel.

12. A method for testing the performance of a dynamometer and the control system thereof as set forth in claim 9 wherein the device to measure the roller speed of the dynamometer comprises a magnetic pulse counter.

13. A method for testing the performance of a dynamometer and the control system thereof as set forth in claim 9 wherein the roller speed is obtained from the dynamometer and the control system.

14. A method for testing the performance of a dynamometer and the control system thereof as set forth in claims 9, 10, 11, 12 or 13 wherein a load measuring device independent of the dynamometer and the control system's existing load measuring device is used in place of the original load measuring device to originate the load signal.

15. A method for testing the performance of a dynamometer and the control system thereof as set forth in claim 9 wherein multiple load measuring devices and roller speed measuring devices are used by the dynamometer and the control system thereof.

16. A device for testing the performance of a dynamometer and a control system thereof which is external to and independent of the dynamometer and the control system thereof being evaluated comprising:

(a) a device for measuring roller speed of the dynamometer which is capable of feeding a speed signal to a data acquisition system (b) a device for measuring a dynamometer's load equivalent signal which is capable of feeding a signal back to a data acquisition system from the dynamometer and the control system thereof, (c) a data acquisition system that records the speed and load data from the devices set forth in (a) and (b), wherein the devices set forth in (a), (b) and (c) are all external to the dynamometer and the control system thereof.

* * * * *